United States Patent [19]
Archer et al.

[11] 3,735,256
[45] May 22, 1973

[54] SIGNAL SPECTRUM ANALYZER

[75] Inventors: Donald H. Archer; Robert J. Prickett, both of Santa Barbara, Calif.

[73] Assignee: Raytheon Company, Lexington, Mass.

[22] Filed: Aug. 26, 1971

[21] Appl. No.: 175,302

[52] U.S. Cl. ................... 324/77 D, 343/753, 343/909
[51] Int. Cl. ......................... G01r 23/16, G01r 27/02
[58] Field of Search ................ 324/77 E, 77 D, 77 K; 343/753, 754, 755, 911 L, 909

[56] References Cited

UNITED STATES PATENTS

| | | | |
|---|---|---|---|
| 3,327,309 | 6/1967 | Shulman et al. | 343/753 X |
| 3,170,158 | 2/1965 | Rotman | 343/753 X |
| 2,665,383 | 1/1954 | Marie | 343/909 X |
| 2,841,793 | 7/1958 | Young, Jr. | 343/909 |
| 2,884,629 | 4/1959 | Mason | 343/753 |
| 3,158,862 | 11/1964 | Chisholm | 343/909 X |
| 3,305,867 | 2/1967 | Miccioli et al. | 343/754 X |
| 3,394,378 | 7/1968 | Williams et al. | 343/909 X |
| 3,354,461 | 11/1967 | Kelleher | 343/9754 X |
| 3,568,207 | 3/1971 | Boyns et al. | 343/754 |
| 3,587,097 | 6/1971 | Stull, Jr. | 324/77 E X |

*Primary Examiner*—Stanley T. Krawczewicz
*Attorney*—Philip J. McFarland

[57] ABSTRACT

A radio frequency signal spectrum analyzer, suitable for fabrication on a single substrate and adapted to provide a substantially instantaneous indication of the frequency of a signal is disclosed. The spectrum analyzer includes a two dimensional constrained electromagnetic lens system having each one of its input ports coupled to the signal source through an electrical path of different predetermined electrical lengths. The energy of the signal passes through each one of the electrical paths to each one of the input ports and then is focused by the lens system to particular output ports of such antenna in accordance with the frequency of the signal. The frequency of the signal is determined by measuring the energy level in the various output ports of the lens system.

9 Claims, 3 Drawing Figures

Patented May 22, 1973

SIGNAL SPECTRUM ANALYZER

BACKGROUND OF THE INVENTION

The invention relates generally to signal spectrum analyzers and more particularly to compact radio frequency signal spectrum analyzers suitable for relatively simple fabrication on a single substrate and adapted to provide a substantially instantaneous indication of, over a wide band of frequencies, the frequency of a signal.

It is known in the art that so-called signal spectrum or frequency analyzers may be used to detect and measure different radio frequency signals within a band of frequencies. Thus, in one known type of spectrum analyzer it is known to provide an oscillator, the frequency of the output signal thereof being variable, as the local oscillator of a heterodyne receiver. Consequently, the frequency of a radio frequency signal may be determined by sweeping the local oscillator over a band of frequencies while observing the frequency of the oscillator when an output signal is present at the second detector of the receiver. Such spectrum analyzer, however, has shortcomings as where the signal being analyzed has a short time duration because the local oscillator may not sweep through the necessary band of frequencies while the signal is present. An approach to obviate the above-mentioned shortcoming is to use a spectrum analyzer which is adapted to provide substantially instantaneous detection of radio frequency signals over a band of frequencies. Such instantaneous detection has been accomplished through the use of a comb filter, meaning a bank of bandpass filters, each filter therein being tuned to a different center frequency. The frequency of a radio frequency signal may then be determined by observing which ones of the individual filters pass radio frequency energy. It is obvious that if the number of frequencies is larger, then the number of bandpass filters is correspondingly larger. Therefore, where it is desirable to have a relatively simple spectrum analyzer which covers a large number of frequencies, any known type of comb filter is not desirable because of their relative complexity.

SUMMARY OF THE INVENTION

It is therefore an object of the invention to provide an improved spectrum analyzer for radio frequency energy signals.

It is another object of the invention to provide an improved spectrum analyzer for radio frequency energy signals, such analyzer being adapted to provide a substantially instantaneous indication of, over a wide band of frequencies, the frequencies of such signals.

It is another object of the invention to provide a spectrum analyzer for radio frequency signals which is relatively simple in construction and suitable for fabrication on a single substrate.

It is another object of the invention to provide a spectrum analyzer for radio frequency signals which is relatively simple in construction so as to be fabricated on a single substrate and adapted to provide a substantially instantaneous indication of, over a wide band of frequencies, the frequencies of such signals.

These and other objects of the invention are attained generally by providing means for coupling a radio frequency signal to each one of the input ports of a two dimensional constrained electromagnetic lens system such that the relative phases of the signals at such input ports are related to the frequency of the signal. The lens system focuses the energy of input signals to particular ones of a plurality of the output ports of such lens system in accordance with the relative phases of such signals, thereby indicating the frequency of the input signals. Means are provided to determine which one, or ones, of the output ports are energized.

DESCRIPTION OF THE PREFERRED EMBODIMENTS

Figure 1:
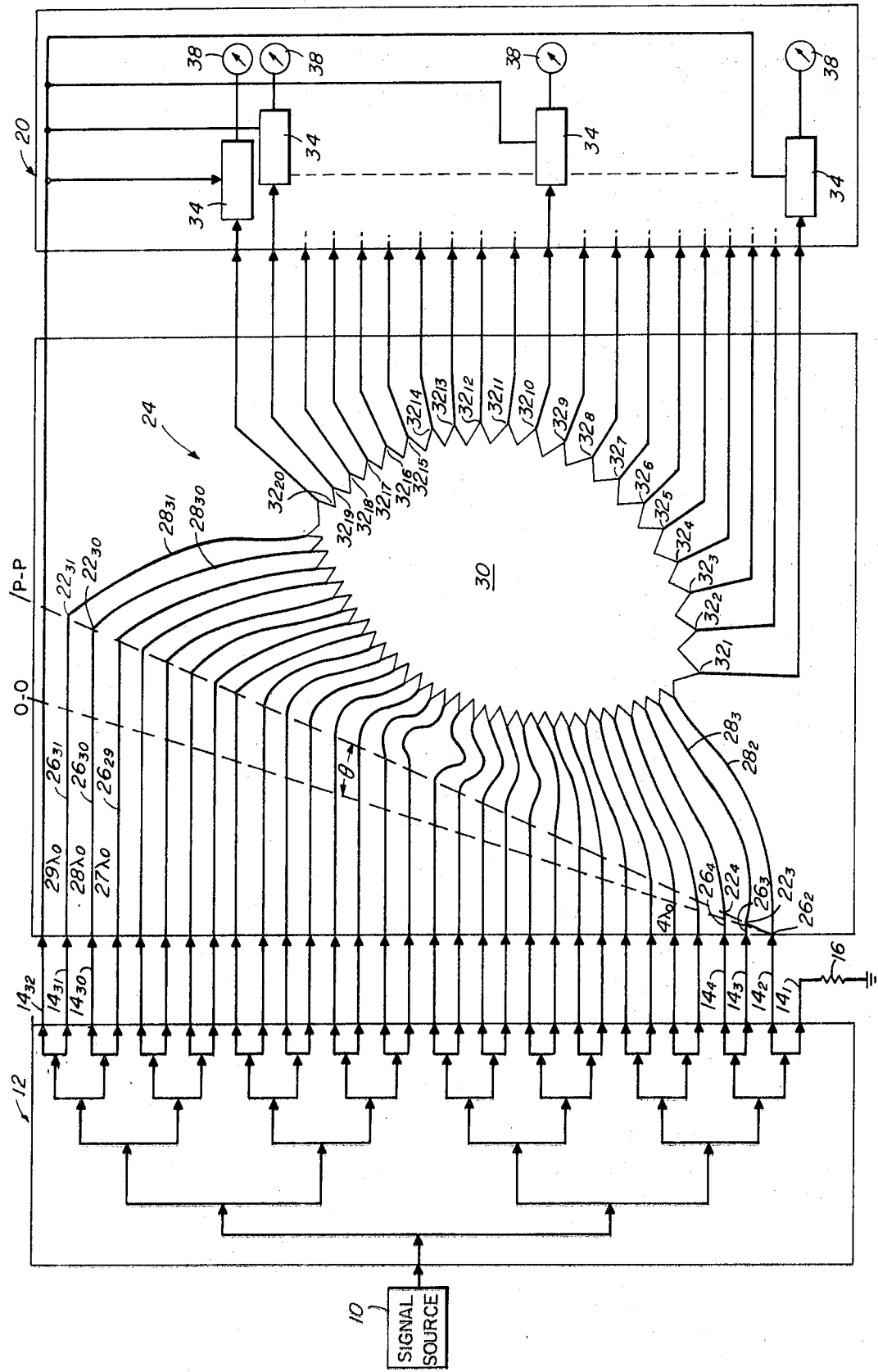
FIG. 1 shows a spectrum analyzer employing the features of the invention.

Referring now to FIG. 1 it may be seen that the spectrum analyzer according to the invention is coupled to a suitable radio frequency signal source 10, such analyzer here being designed to determine the frequency of such signal over a band of frequencies in the order of one octave wide, such band having a center frequency $f_o$ (and wavelength $\lambda_0$). The spectrum analyzer includes a power divider 12 for separating the energy of the signal produced by signal source 10 equally into a plurality of channels, $14_1$–$14_{32}$. Channel $14_1$ is terminated in a suitable matched load 16. Channel $14_{32}$ serves as a reference channel and is coupled to detector network 20, as shown. Each one of the channels $14_2$–$14_{31}$ is coupled, respectively, to a particular one of input ports $22_2$–$22_{31}$ as shown through transmission lines $26_2$–$26_{31}$. The electrical length of each transmission line $26_2$–$26_{31}$ differs one from the other by an integral multiple of the wavelength, $\lambda_0$ (here one wavelength). In particular, with the electrical length of transmission line $26_2$ as a reference, line $26_3$ is "$\lambda_0$" longer, line $26_4$ is "$2\lambda_0$" longer ... line $26_{31}$ is "$29\lambda_0$" longer as indicated. Consequently, if the frequency of a signal produced by signal source 10 is $f_0$, the phase angle between signals appearing at input ports $22_2$–$22_{31}$ will be the same. Likewise, if the frequency of such signal is other than $f_0$, the phase angle between signals appearing at input ports $22_2$–$22_{31}$ will not be the same. In particular, the difference in the phase angle between signals at successive input ports will differ by a constant represented by a planar wavefront "0—0" as shown.

Two dimensional constrained electromagnetic lens system 24 includes, in addition to input ports $22_2$–$22_{31}$, a plurality of transmission lines $28_2$–$28_{31}$, a parallel plate lens 30 and a plurality of output ports $32_1$–$32_{20}$ disposed along an arc of best focus of parallel plate lens 30 and coupled to detector network 20 as shown. One such lens system is described in an article entitled "Angle Microwave Lens for Line Source Applications" by W. Rotman and R. F. Turner published in IEEE Transactions on Antenna and Propagation, November 1963, pages 623 to 632. As is known, the disposition of the input ports $22_2$–$22_{31}$, the length of each one of the transmission lines $28_2$–$28_{31}$ and the configuration of parallel plate lens 30 are such that the energy of signals at the input ports $22_2$–$22_{31}$ becomes focused to a particular one, or ones, of the output ports $32_1$–$32_{20}$ in accordance with the relative phases of the signals at such input ports. It may be observed that the signals at input ports $22_2-22_{31}$ may be considered as being a planar wavefront of radio frequency energy received by the lens system 24. In particular, if the relative phases of the signals at input ports $22_2-22_{31}$ are the same, the energy in such signals becomes focused to output port $32_{10}$; that is, such signals at input ports $22_2-22_{31}$ may be considered as a wave of energy having a planar wavefront oriented parallel to line P—P. Likewise, if the planar wavefront is at an angular offset, say "$\theta$" (i.e. along say line O—O) with respect to line P—P, the energy of such signals at input ports $22_2-22_{31}$ becomes focused at a different one of the output ports $33_1-32_{20}$ in accordance with such angular offset. As mentioned, because of the particular electrical lengths of transmission lines $26_2-26_{31}$, the relative phases of the signals at input ports $22_2-22_{31}$ (i.e. the angular offset of the "planar wavefront") are related to the frequency of the signal produced by the signal source 10. A little thought will make it apparent, therefore, that the energy of the signal produced by signal source 10 is focused to particular output ports $32_1-32_{20}$ in accordance with the frequency of such signal and the frequency of such signal may be determined by measuring the energy at each one of such output ports.

Detector network 20 is provided to determine the related energy between the energy appearing at output ports $32_1-32_{20}$ and thereby provide an indication of the frequency of the signal produced by signal source 10. Such network includes a plurality of radio frequency receivers 34, each one of such plurality of receivers being coupled to one of the output ports $32_1-32_{20}$. Each receiver is also coupled to the reference channel in any convenient manner such that the level of the signal out of receiver 34 is related to the amount of energy collected at the output port coupled to such receiver. The level of the signal out of each receiver is determined by any conventional apparatus, here by voltmeters 38.

Figure 2:
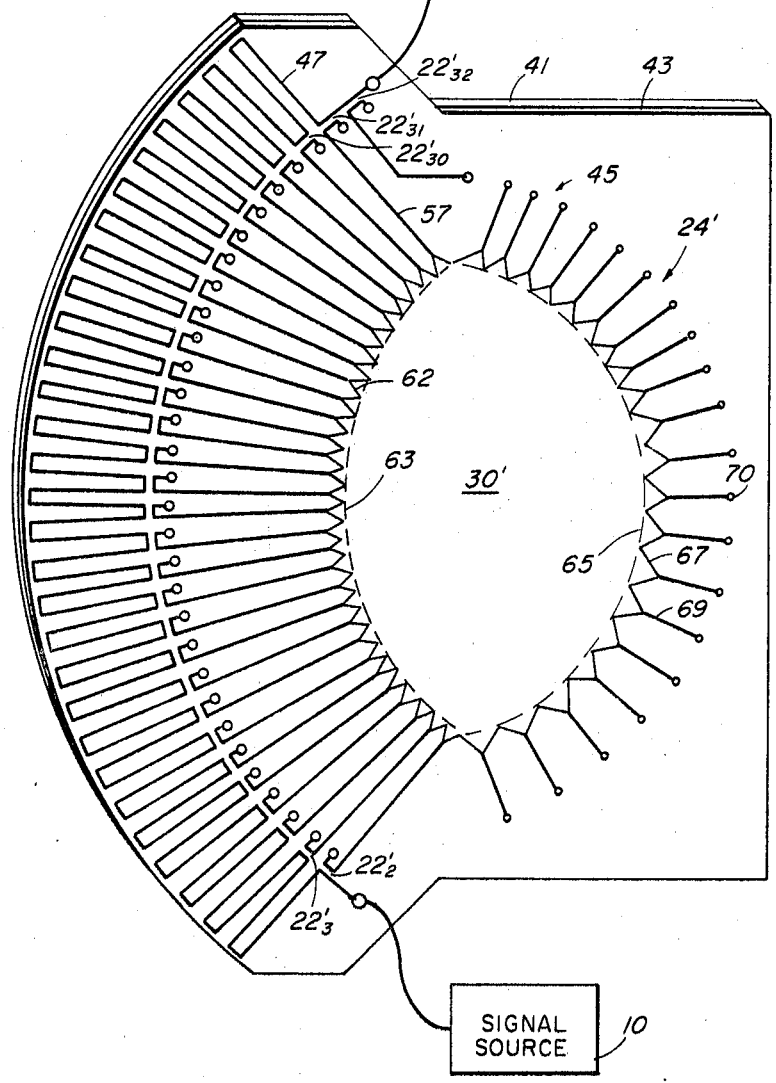
FIG. 2 shows a spectrum analyzer employing the features of the invention and suitable for fabrication on a single substrate.

Referring now to FIG. 2, a spectrum analyzer according to the invention is shown, such analyzer being fabricated on a laminar arrangement made up of a first metallic ground plate 41, and a dielectric substrate 43 (on which circuitry 45 described in detail hereinafter is printed). It will be recognized that such an arrangement constitutes a conventional "microstrip" configuration for providing constrained paths for radio frequency energy (such paths to be described).

It is essential that the material from which the dielectric substrate 43 be fabricated have a dielectric constant, or index or refraction, greater than that of air, here taken to be 1. For efficiency of operation and ease of fabrication it is desirable that the dielectric substrate 43 have a relatively low loss tangent and that it be easily machined. For these reasons it is here preferred that the dielectric substrate 43 have a relatively low loss a sheet of sintered magnesium titanate having a dielectric constant of approximately 16, although other materials may be used. For example, rutile (dielectric constant approximately 100) or an epoxy base loaded with rutile (dielectric constant approximately 25) may also be used as the material for the dielectric substrate 43.

The circuitry 45 is comprised of two sections: A microstrip line 47 (terminated in a matched load 16' as shown) with directional coupler tap-offs 22' disposed at uniform intervals along such line performs the functions of the power divider 12 and transmission lines $26_2-26_{32}$ shown in FIG. 1; and a two dimensional constrained electromagnetic lens system 24 having its input ports coupled to the microstrip line 47 by the directional coupler tap-offs 22'. Here a length of $10\lambda_0$ between adjacent directional coupler tap-offs 22' cooperating with line 47 is used in order to produce a tenfold increase in the frequency resolution as compared with the spectrum analyzer in FIG. 1. Each input port of the lens system is connected through a printed line 57 to a conductive surface of a parallel-plate lens 30' via a matching section 62. The intersections of matching sections 62 and the parallel-plate lens 30' here describe an arc of a circle indicated by the dotted line marked 63. The second surface (sometimes referred to hereinafter as the focal arc or the arc of best focus) of the parallel-plate lens 30' is indicated by the dotted line 65. Therefore, the parallel-plate lens is lenticular in shape. Matching sections 67 are printed along the focal arc of the parallel-plate lens 30' as shown. Each one of such sections, being faired into a different one of printed lines 69, leads to an output port 70 for a different frequency. Each one of such output ports is connected to a separate one of the receivers (not shown) of detector network 20 (FIG. 1). In passing it will be noted that the number of printed lines 57 may, and usually will, differ from the number of output ports 70.

The relative phase of the signals at input ports $22_2'-22_{31}'$ is related to the frequency of the signal supplied by signal source 10. Likewise the energy of such signals at input ports $22_2'-22_{31}'$ become focused at a different one of the output ports 70 in accordance with such relative phase. Therefore, as with the spectrum analyzer in FIG. 1, the energy of the signal produced by signal source 10 is focused to particular output ports 70 in accordance with the frequency of such signal. The frequency of such signal may then be determined by measuring the energy at each one of such output ports by a detector network 20 (not shown).

It will be recognized that, disregarding any mutual coupling between the various parts of the "microstrip" configuration just described and any mismatches therein, the just-mentioned portions of circuitry 45, the dielectric substrate 43 and the metallic ground plate 41 constitute a two-dimensional constrained electromagnetic lens system. It is known in the art, e.g. as shown in the paper entitled "Wide Angle Microwave Lens for Line Source Applications" by W. Rotman and R. F. Turner (Transactions on Antennas and Propagation, pp. 623–632, published in November 1963 by the Institute of Electrical and Electronic Engineers, Inc., November New York, N.Y.), that the parameters of such a lens system may be varied to focus radio frequency energy at points on an arc of best focus in accordance with the phase of radio frequency signals at a number of input ports. Thus, according to Rotman and Turner, the parameters may be selected to provide a lens assembly similar to that here shown.

The physical size of known two dimensional constrained electromagnetic lens systems made with a parallel-plate lens and coaxial transmission lines is relatively great. That is, because the velocity of propagation of electromagnetic energy in either coaxial transmission lines or a parallel-plate lens with air as a dielectric approaches the velocity of propagation of electromagnetic energy in free space, the use of elements results in a lens system having a relatively long focal length. It follows, than, that the arc of best focus must be physically spaced a correspondingly large distance from the input ports. In applications in which physical size is at a premium, such a requirement of known parallel-plate lenses militates against their use. We have, however, by incorporating dielectric material having a dielectric constant greater than the dielectric constant of air, effected a reduction in the velocity of propagation of radio frequency energy in our lens assembly with a concomitant reduction in the physical size of such an assembly. Thus, we have found that if a two dimensional constrained electromagnetic lens system is designed following the teachings of Rotman and Turner, the physical dimensions of the parallel-plate lens and the length of the required transmission lines may be scaled down from the dimensions required with air as the dielectric material by a factor equal to the square root of the dielectric constant of the dielectric material used as a substrate.

In a practical array lens system assembly using a parallel-plate lens and transmission lines it is not possible to overlook the effects of mutual coupling and mismatches. That is, the VSWR for electromagnetic energy within such an assembly must be carefully controlled in order to avoid excessive insertion losses and internal reflections. Thus, in known lens system assemblies it is common practice to provide matched coupling between the parallel-plate lens and the transmission lines, as by conventional impedance transformers. Unfortunately, as the frequency of the radio frequency energy changes from a nominal design frequency, the use of matching sections such as impedance transformers (which are frequency-sensitive) changes an inherently broadband antenna arrangement to a relatively narrow band one.

Even if the parallel-plate lens and transmission lines of known array antennas are perfectly matched at a design frequency, the problem of coupling discrete and separate elements with respect to each other to permit efficient power transfer remains. Thus, in order that radio frequency energy be transferred efficiently between a parallel-plate lens and a number of transmission lines by means of orthogonal coupling devices the positioning of each device is critical, being optimum only at the design frequency. Consequently, when the frequency of the radio frequency energy is changed from a design frequency, the efficiency of power transfer decreases. Again, an inherently broadband arrangement is converted into a relatively narrow band arrangement.

The foregoing difficulties are obviated to a large degree by following our concept of replacing the discrete and separate elements of a radio frequency lens system, i.e. the coaxial transmission lines and parallel-plate lens heretofore used, with stripline or microstrip circuits integrally formed on a dielectric substrate along with the desired lens elements with "in-line" matching sections. As a consequence, the parallel-plate lens, the transmission lines and the matching sections may be printed on one side of a dielectric substrate.

Figure 3:
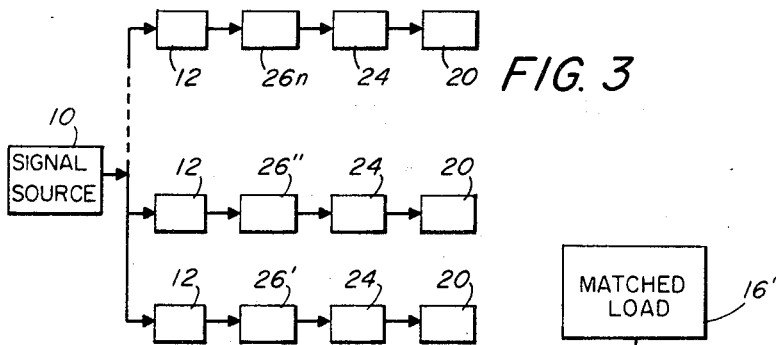
FIG. 3 shows an alternate embodiment of the invention.

FIG. 3 shows a spectrum analyzer according to the invention for detecting the frequency of a signal produced by signal source 10 over a band of frequencies ($f_n - f_1$) wide. Thus, each one of $n$ transmission line sections 26' to 26$^n$ is coupled to such signal source through one of the n power dividers 12, as shown. Each one of such transmission line sections 26' to 26$^n$ includes a set of transmission lines (not shown), each transmission line in each such section varying in electrical length one from the other by an integral multiple of wavelength $\lambda_1$, for transmission line section 26', to $\lambda_n$ for transmission line section 26$^n$, respectively, in the manner described in reference to FIG. 1. Each one of $n$ two dimensional constrained lens system 24 is coupled to a respective one of the transmission line sections, as shown. A detector network 20 is coupled to each one of the two dimensional constrained lens system, as shown, so that the center frequency of the band of frequencies passing to each such detector differs one from the other. In particular, the center frequency of the band of frequencies detected by such detectors will be $f_1$ to $f_n$ respectively (where $f_1$ to $f_n$ have wavelengths $\lambda_1$ to $\lambda_n$ respectively.) A little thought will make it apparent that by selection of the electrical length $\lambda_1$ to $\lambda_n$ of the transmission lines in each transmission line section, the spectrum analyzer shown in FIG. 3 may be used to detect frequencies over a band of frequencies n octaves wide. Alternatively, the resolution within any octave may be increased by proper selection of the electrical length $\lambda_1$ to $\lambda_n$ and proper selection of the multiple wavelength between transmission lines in each transmission line section.

It is to be understood that the drawings and descriptive matter are in all cases to be interpreted as merely illustrative of the invention, rather than as limiting the same in any way, since it is contemplated that various changes may be made in the various elements to achieve like result without departing from the spirit and scope of the appended claims.

What is claimed is:

1. A spectrum analyzer for determining the frequency spectrum of a radio frequency signal, comprising:
   a. means for coupling the radio frequency signal to each one of a plurality of input ports through paths of different electrical lengths;
   b. means focusing the signal at each one of the input ports on at least one of a plurality of output ports; and
   c. means, coupled to the plurality of output ports, for determining which thereof is energized by the signal focused thereon.

2. The spectrum analyzer recited in claim 1 wherein the focusing means includes a two dimensional constrained lens.

3. The spectrum analyzer recited in claim 1 including a substrate, such substrate having formed thereon the coupling means and the focusing means.

4. The spectrum analyzer recited in claim 3 wherein the focusing means includes a two dimensional constrained lens.

5. A spectrum analyzer, comprising:
   a. means for coupling the analyzer to a source of radio frequency energy;
   b. a plurality of input ports;
   c. means for coupling the source to each one of the plurality of input ports, through paths of different electrical lengths;
   d. means, coupled to the plurality of input ports, for focusing the energy of the signals at each one of the plurality of input ports to at least one of a plurality of output ports, such focusing being in accordance with the relative phase between the signals at successive ones of the plurality of input ports; and
   e. means, coupled to the plurality of output ports, for determining which thereof is energized by the signal focused thereon.

6. The spectrum analyzer recited in claim 5 wherein the coupling means includes a plurality of transmission lines.

7. The spectrum analyzer recited in claim 5 including a substrate, such substrate having formed thereon the plurality of input ports, the coupling means and the focusing means.

8. The spectrum analyzer recited in claim 7 wherein the adjusting means includes a microstrip line, such microstrip line having a plurality of directional couplers, each one thereof being coupled to a different one of the plurality of input ports.

9. A spectrum analyzer operative over the frequency range $f_1$ to $f_2$, comprising:
   a. means for coupling the analyzer to a source of radio frequency energy;
   b. a plurality of input ports;
   c. means for coupling the source to each one of the plurality of input ports, through paths of different electrical lengths, the electrical length differing between successive ones of the plurality of input ports by an integral multiple of a wavelength $\lambda_o$, where $\lambda_o$ is the wavelength of a signal having a frequency $f_1 + f_2/2$;
   d. means for focusing the signals at each one of the input ports to at least one of a plurality of output ports in accordance with the relative phase between the signals at successive ones of such input ports; and
   e. means, coupled to the plurality of output ports, for determining which thereof is energized by the signal focused thereon.

\* \* \* \* \*